(12) United States Patent
Mitsui

(10) Patent No.: US 8,144,338 B2
(45) Date of Patent: Mar. 27, 2012

(54) PATTERN MEASUREMENT APPARATUS AND PATTERN MEASUREMENT METHOD

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/546,587

(22) Filed: Aug. 24, 2009

(65) Prior Publication Data

US 2010/0046006 A1    Feb. 25, 2010

(30) Foreign Application Priority Data

Aug. 25, 2008    (JP) ................. 2008-215703

(51) Int. Cl.
*G01B 11/24*    (2006.01)

(52) U.S. Cl. ........ 356/604; 250/306; 250/311; 382/145; 382/199

(58) Field of Classification Search .......... 250/306–311; 356/604; 382/145–199
See application file for complete search history.

(56) References Cited

U.S. PATENT DOCUMENTS

| | | | |
|---|---|---|---|
| 6,869,807 B2 * | 3/2005 | Yoshitake et al. ................. | 438/7 |
| 7,084,990 B2 | 8/2006 | Sasazawa et al. | |
| 7,388,677 B2 | 6/2008 | Vuong et al. | |
| 7,668,373 B2 * | 2/2010 | Mitsui ........................... | 382/181 |
| 7,732,761 B2 * | 6/2010 | Tanaka et al. ................. | 250/307 |

FOREIGN PATENT DOCUMENTS

JP    2005-142535    6/2005

OTHER PUBLICATIONS

Chui et al., "A New Algorithm for Non-Rigid Point Matching," IEEE Conference on Computer Vision and Pattern Recognition (CVPR) (2000), II:1-8.

* cited by examiner

*Primary Examiner* — Gregory J Toatley
*Assistant Examiner* — Iyabo S Alli
(74) *Attorney, Agent, or Firm* — Finnegan, Henderson, Farabow, Garrett & Dunner, L.L.P.

(57) ABSTRACT

A pattern measurement method includes: acquiring sectional shapes of a first pattern corresponding to process parameters, respectively; using the acquired sectional shapes to calculate predicted spectral waveforms which would be obtained when light is applied to the first pattern, and adding information on the corresponding process parameters to the calculated predicted spectral waveforms, respectively, to form a waveform library; setting a process parameter to obtain a desired shape, and acquiring an actual spectral waveform of a second pattern actually created from the first pattern using the set process parameter; performing waveform matching between the actual spectral waveform and the predicted spectral waveforms to acquire matching scores for respective waveform matching, and calculating an optimum process parameter providing the maximum matching score; generating an optimum pattern sectional shape corresponding to the optimum process parameter to measure the optimum pattern sectional shape.

8 Claims, 9 Drawing Sheets

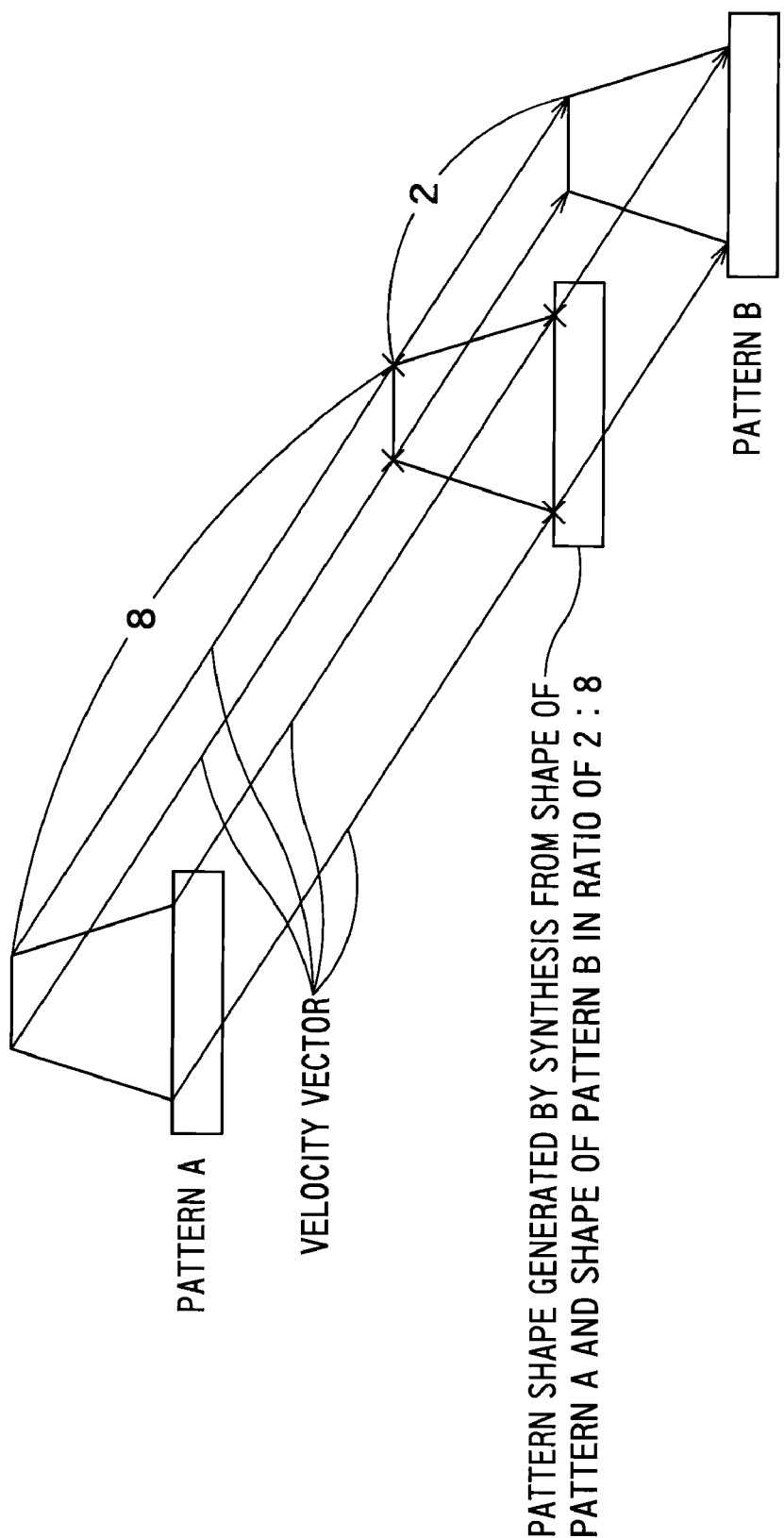

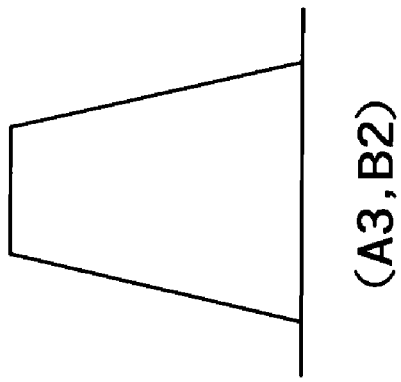
FIG. 10C (A3, B2)
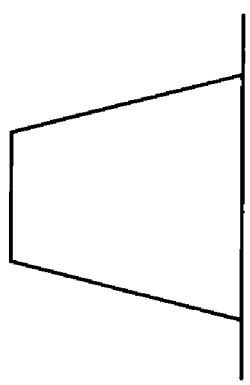
FIG. 10B (Am, Bm)
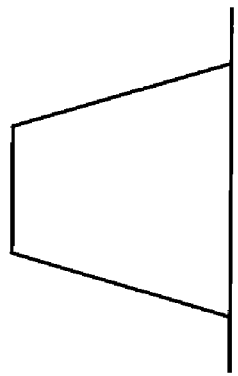
FIG. 10A (A2, B2)

PATTERN MEASUREMENT APPARATUS AND PATTERN MEASUREMENT METHOD

CROSS REFERENCE TO RELATED APPLICATION

This application claims benefit of priority under 35 USC §119 to Japanese patent application No. 2008-215703, filed on Aug. 25, 2008, the contents of which are incorporated by reference herein.

BACKGROUND OF THE INVENTION

1. Field of the Invention

The present invention relates to a pattern measurement apparatus and a pattern measurement method.

2. Related Background Art

The manufacture of a semiconductor device requires not only manufacturing steps such as a lithographic step, a film formation step and an etching step but also a step of measuring a micropattern created by the above-mentioned steps to improve yield. For a pattern measurement, a CD measurement using a critical dimension scanning electron microscope (CDSEM) has heretofore been performed.

Recently, in order to meet the demands for the increase of performance and function of a device, the size of a pattern has been increasingly smaller, and the two-dimensional and three-dimensional shapes of the pattern have also been increasingly complex as typified by a double patterning technique. In order to evaluate the pattern having such complex shapes, it is necessary to measure the sectional shape of the pattern in contrast with the conventional CD measurement which only measures the CD of a particular part of the pattern section.

Conventionally, a method based on a destructive measurement by, for example, a sectional SEM or a transmission electron microscope (TEM) has been used for the measurement of pattern sections. On the other hand, due to increasing demands for the measurement of pattern sections in a nondestructive manner, scatterometry using light has been recently becoming more popular. The technique of the scatterometry is as follows: Light is applied to a measurement target pattern, and the spectral waveform of the reflected light is used to estimate a corresponding pattern sectional shape and an index of refraction by referring to a waveform library which depends on the pattern sectional shape previously constructed by a numerical calculation (refer to Japanese Patent Laid-open Pub. No. 2005-142535).

The scatterometry is advantageous not only in that it is a nondestructive measurement but also in that it is capable of measuring, for example, the height and sidewall angle as well as CD of a pattern. On the other hand, the disadvantage of the scatterometry is that it requires previous construction of the waveform library, which demands a great amount of work. In particular, in order to create a model which approximates the pattern sectional shape by, for example, a trapezoid, it is necessary to previously know the change of the pattern sectional shape corresponding to process variations. To this end, know-how is required to perform modeling of the section of the pattern by watching a photograph thereof.

As described above, to obtain a highly accurate measurement result, a great amount of cost (labor and time for a skilled engineer) is needed to create a good waveform library, which has been a heavy burden. Another disadvantage is measurement robustness which prevents, even if a measurement is thus made with much cost, a correct measurement value from being calculated for an unexpected pattern sectional shape that is not contained in the waveform library due to, for example, to process variations.

SUMMARY OF THE INVENTION

According to a first aspect of the present invention, there is provided a pattern measurement apparatus comprising:
 a library creating unit which acquires a plurality of sectional shapes of a first pattern corresponding to a plurality of process parameters for creation of the pattern, respectively, uses the acquired plurality of sectional shapes to calculate predicted spectral waveforms which would be obtained when light is applied to the first pattern, and adds information on the corresponding process parameters to the calculated predicted spectral waveforms, respectively, to form a waveform library;
 a spectral waveform acquiring unit which actually acquires a spectral waveform of a second pattern as a measurement target, the second pattern being obtained by actually creating the first pattern by use of a process parameter set to obtain a desired shape;
 a process parameter calculating unit which performs waveform matching between the actually acquired spectral waveform and the predicted spectral waveforms to acquire matching scores for respective waveform matching, and calculates an optimum process parameter providing a maximum matching score from the obtained matching scores;
 a sectional shape generating unit which generates an optimum pattern sectional shape corresponding to the optimum process parameter; and
 a measurement unit which measures the optimum pattern sectional shape.

According to a second aspect of the present invention, there is provided a pattern measurement method comprising:
 acquiring a plurality of sectional shapes of a first pattern corresponding to a plurality of process parameters for creation of the first pattern, respectively;
 using the acquired plurality of sectional shapes to calculate predicted spectral waveforms which would be obtained when light is applied to the first pattern, and adding information on the corresponding process parameters to the calculated predicted spectral waveforms, respectively, to form a waveform library;
 setting a process parameter to obtain a desired shape, and actually acquiring a spectral waveform of a second pattern as a measurement target, the second pattern being actually created from the first pattern by use of the set process parameter;
 performing waveform matching between the actually acquired spectral waveform and the predicted spectral waveforms to acquire matching scores for respective waveform matching, and calculating an optimum process parameter providing a maximum matching score from the obtained matching scores;
 generating an optimum pattern sectional shape corresponding to the optimum process parameter; and
 measuring the optimum pattern sectional shape.

BRIEF DESCRIPTION OF THE DRAWINGS

In the accompanying drawings.

FIG. 9 is an explanatory diagram for an image composition technique;

FIGS. 10A to 10C are diagrams showing examples of optimum pattern sectional shapes generated by composition of sectional shapes using an image composition technique.

DETAILED DESCRIPTION OF THE INVENTION

Figure 1:
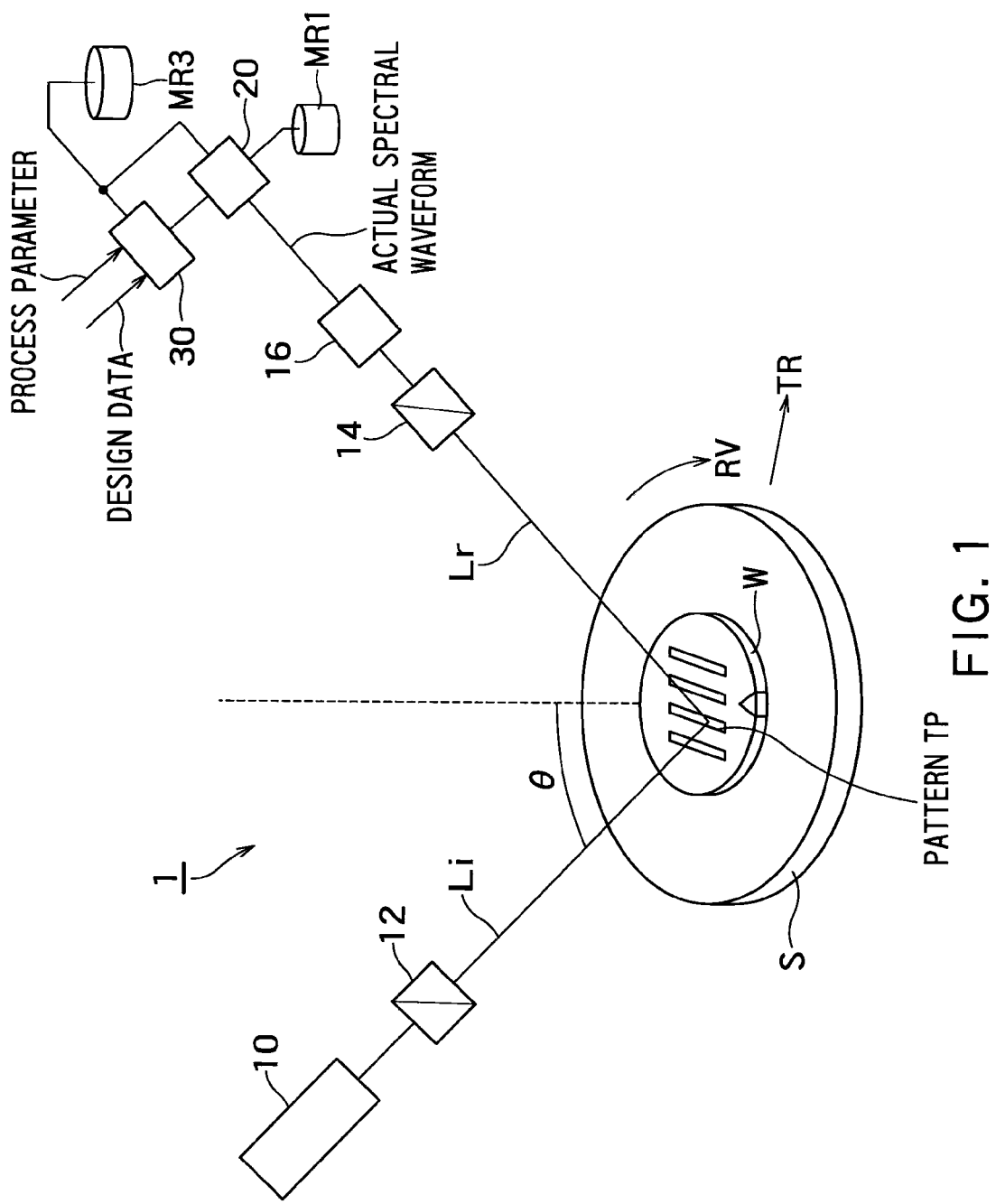
FIG. 1 is a block diagram showing a schematic configuration of one embodiment of a pattern measurement apparatus according to the present invention.

Embodiments of the present invention will hereinafter be described with reference to the drawings. Like reference numerals are assigned to like parts throughout the drawings, and repetitive explanations are properly omitted. Although a micropattern created by semiconductor manufacturing processes such as a lithographic process and an etching process is taken as an example in the cases described in the following embodiments, the present invention is not limited to such cases at all. It should be noted that the present invention is applicable to pattern evaluations in general in various other industrial fields such as processes of manufacturing a liquid crystal panel.

(1) One Embodiment of Pattern Measurement Apparatus

FIG. 1 is a block diagram showing a schematic configuration of one embodiment of a pattern measurement apparatus according to the present invention. A pattern measurement apparatus 1 shown in FIG. 1 includes a light source 10, a polarizer 12, a stage S, an analyzer 14, an array detector 16, a computer 20, a library creating unit 30, and memories MR1, MR3. The light source 10 generates white light. The stage S moves a wafer W by rotational movement (RV direction) and translational movement (TR direction). A pattern TP as a measurement target obtained by actually creating an arbitrary pattern on the wafer W is created on the surface of the wafer W. A process parameter is set in a manner that a desired shape may be obtained in creating the pattern TP. The set process parameter is used to create the pattern TP on the surface of the wafer W. The array detector 16 includes a spectroscope, and outputs an actual spectral waveform of the pattern TP. In the present embodiment, the light source 10, the polarizer 12, the stage S, the analyzer 14 and the array detector 16 correspond to, for example, a spectral waveform acquiring unit.

The computer 20 is connected to the library creating unit 30 and the memories MR1, MR3. The computer 20 reads, from the memory MR1, a recipe file in which there is described process steps in an embodiment of a pattern measurement method according to the present invention described later.

Then, the computer 20 executes library creation and pattern measurement described later. The memory MR1 has a plurality of memory areas. The memory MR1 not only stores the above-mentioned recipe file but also stores the actual spectral waveform of the pattern TP sent from the array detector 16 to the computer 20.

The library creating unit 30 creates a waveform library in accordance with a later-described process in response to a control signal from the computer 20.

Figure 2:
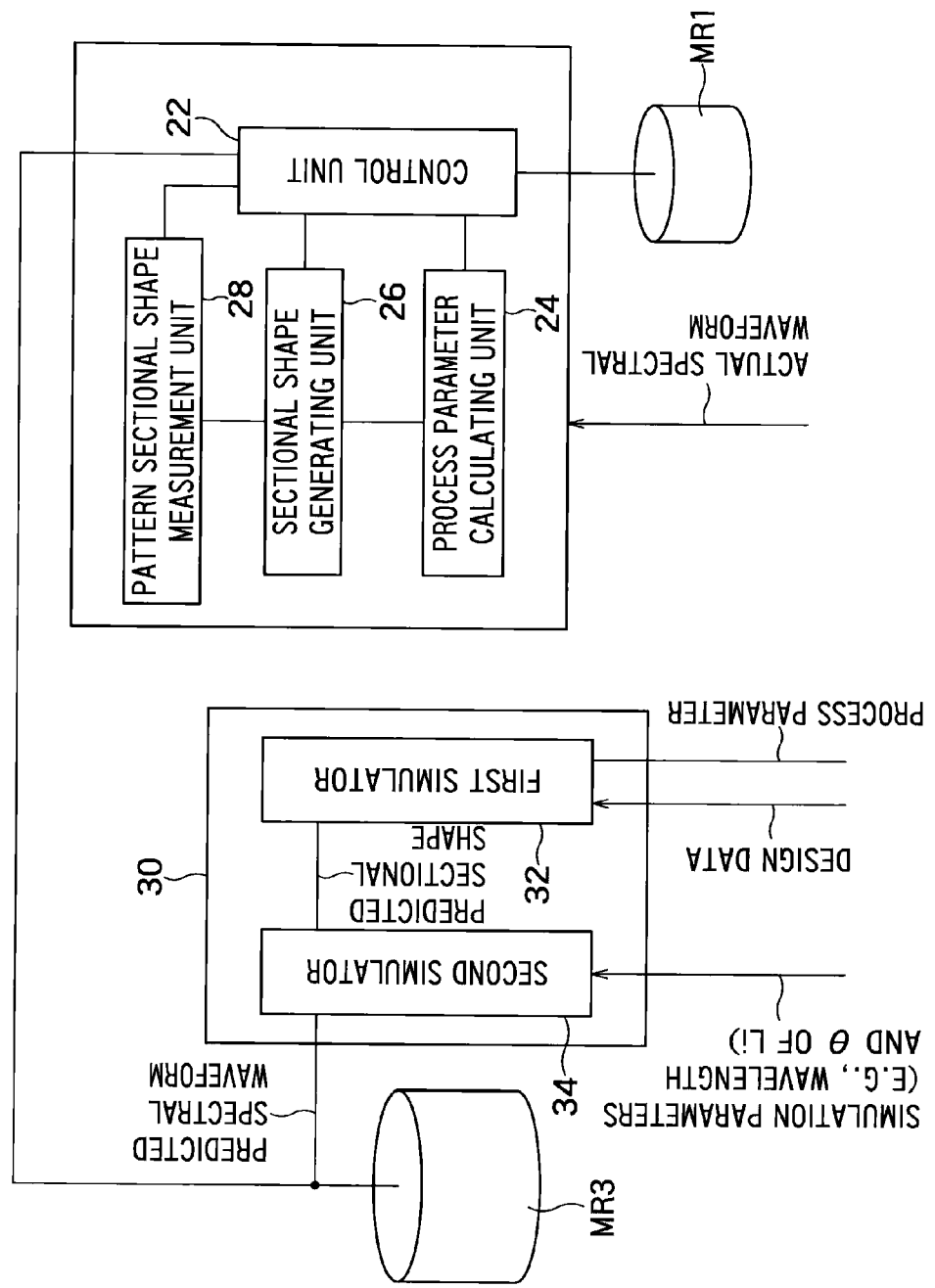
FIG. 2 is a block diagram showing more detailed configurations of a computer and a library creating unit provided in the pattern measurement apparatus shown in FIG. 1.

FIG. 2 is a block diagram showing more detailed configurations of the computer 20 and the library creating unit 30 provided in the pattern measurement apparatus 1 shown in FIG. 1.

As shown in FIG. 2, the computer 20 includes a control unit 22, a process parameter calculating unit 24, a sectional shape generating unit 26 and a pattern sectional shape measurement unit 28. The control unit 22 is connected to the memories MR1, MR3 as well as to the process parameter calculating unit 24, the sectional shape generating unit 26 and the pattern sectional shape measurement unit 28. The control unit 22 supplies control signals to the process parameter calculating unit 24, the sectional shape generating unit 26, the pattern sectional shape measurement unit 28 and the memories MR1, MR3. The process parameter calculating unit 24 is connected to the array detector 16. In response to the actual spectral waveform of the pattern TP as a measurement target inputted from the array detector 16, the process parameter calculating unit 24 calculates a process parameter corresponding to the actual spectral waveform while referring to the waveform library stored in the memory MR3 via the control unit 22. More specifically, the process parameter calculating unit 24 performs a waveform matching between the actual spectral waveform of the pattern TP and a predicted spectral waveform in the waveform library, and thereby acquires a matching score for each waveform matching. From the obtained matching score, the process parameter calculating unit 24 calculates an optimum process parameter providing the maximum matching score. The sectional shape generating unit 26 is also connected to the process parameter calculating unit 24 and the pattern sectional shape measurement unit 28. The sectional shape generating unit 26 receives the optimum process parameter supplied from the process parameter calculating unit 24, and then generates an optimum pattern sectional shape corresponding to the optimum process parameter. In the present embodiment, the pattern sectional shape measurement unit 28 corresponds to, for example, a measurement unit, and performs a measurement in response to the optimum pattern sectional shape supplied from the sectional shape generating unit 26.

The library creating unit 30 includes a first simulator 32 and a second simulator 34. In the present embodiment, the first simulator 32 corresponds to, for example, a sectional shape generating unit. The second simulator 34 is connected to the first simulator 32 and the memory MR3. In the present embodiment, the second simulator 34 corresponds to, for example, a simulator.

In response to design data for the pattern TP and a plurality of process parameters inputted via unshown input device, the first simulator 32 predicts a finished sectional shape in the pattern TP, outputs the number of predicted sectional shapes corresponding to the number of process parameters, and supplies the predicted sectional shapes to the second simulator 34. In response to the simulation parameters supplied via an unshown input device, the second simulator 34 uses the predicted sectional shapes provided from the first simulator 32 to calculate a predicted spectral waveform which would be obtained when light is applied to the pattern TP. Then, the second simulator 34 adds information on the corresponding process parameter to each of the predicted spectral waveforms to form a waveform library, and stores this waveform library in the memory MR3.

More specific operation of the pattern measurement apparatus 1 shown in FIG. 1 is described as the embodiment of the pattern measurement method according to the present invention with reference to FIG. 3 to FIG. 10.

(2) First Embodiment of Pattern Measurement Method

Figure 3:
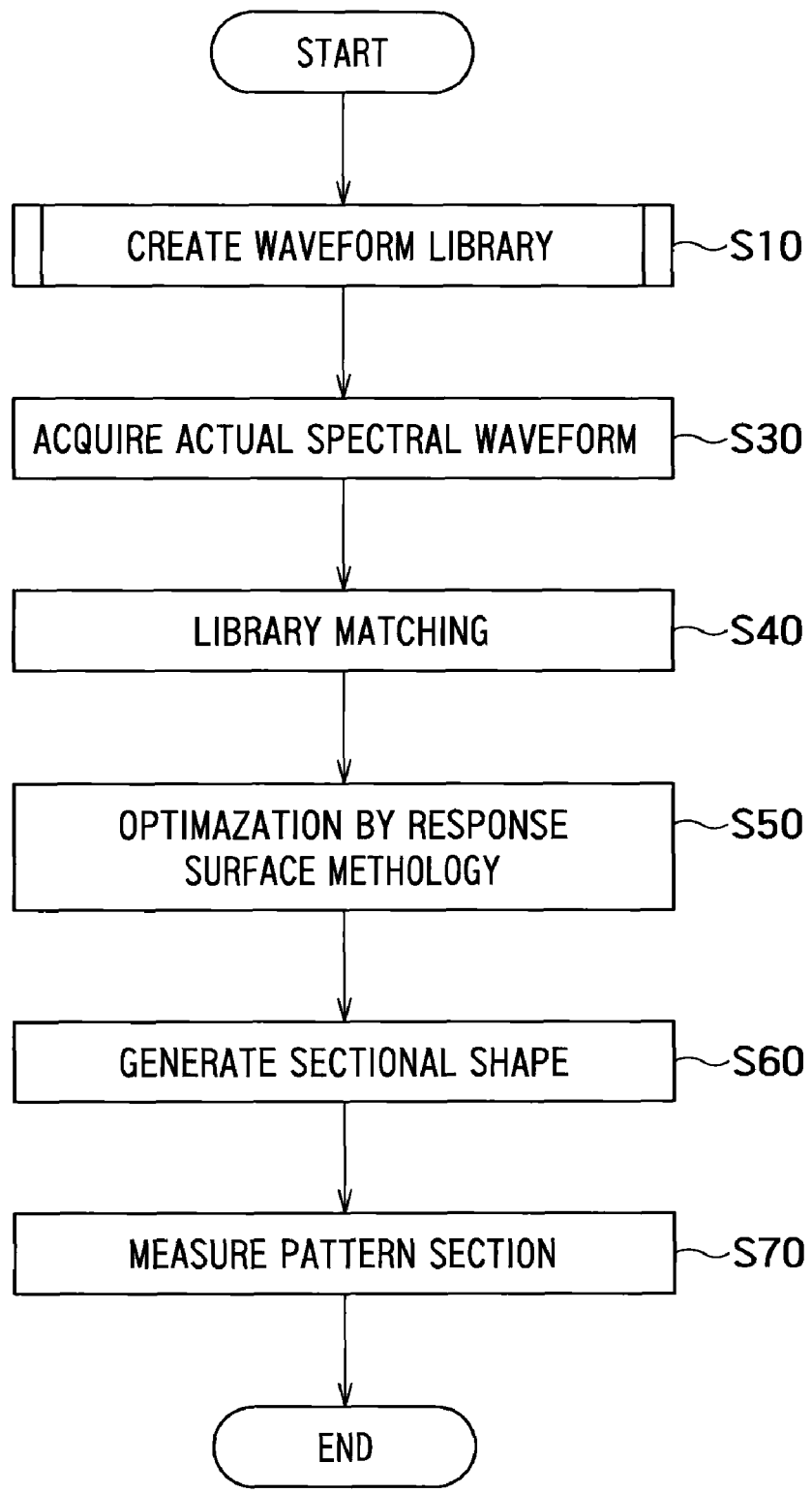
FIG. 3 is a flowchart schematically showing a process in a first embodiment of a pattern measurement method according to the present invention.
Figure 4:
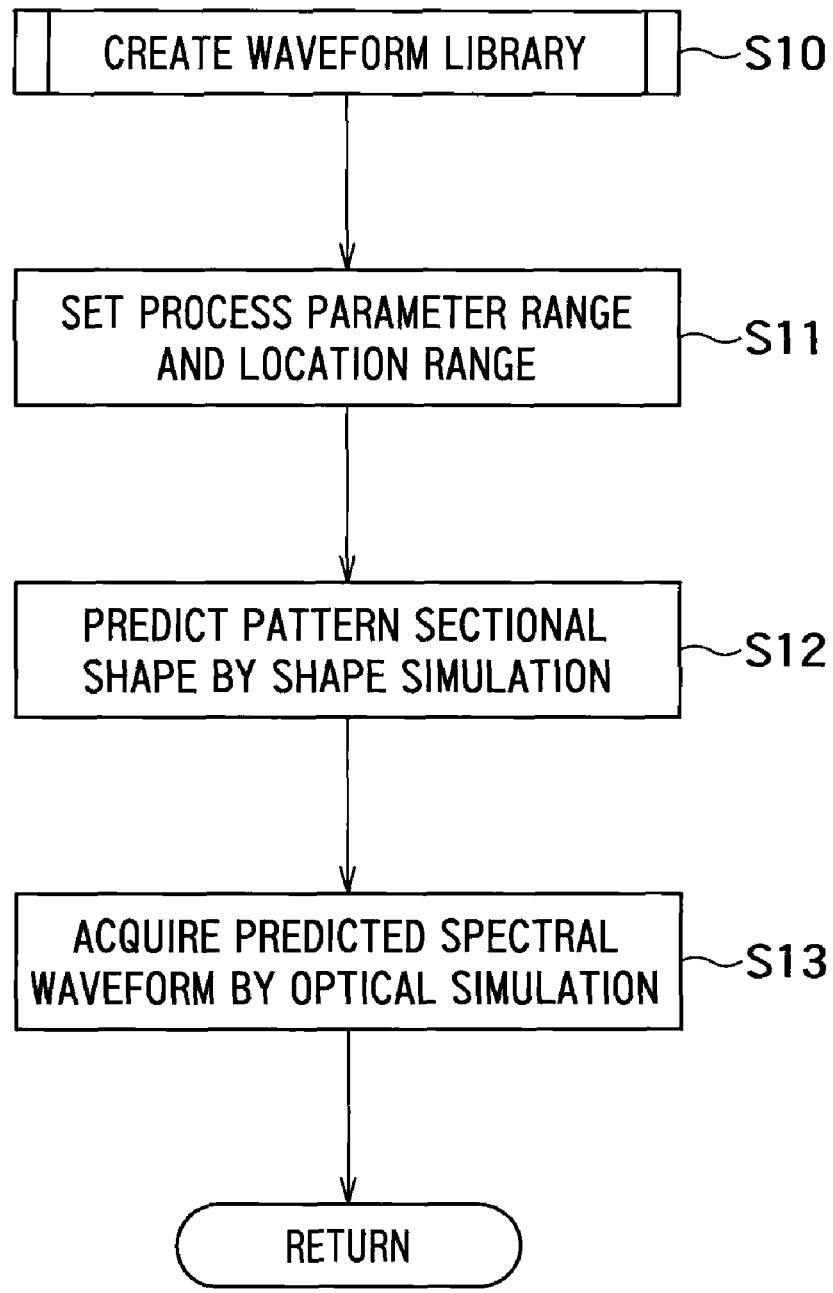
FIG. 4 is a flowchart showing a detailed process of a waveform library creating method in the process shown in FIG. 3.
Figure 5:
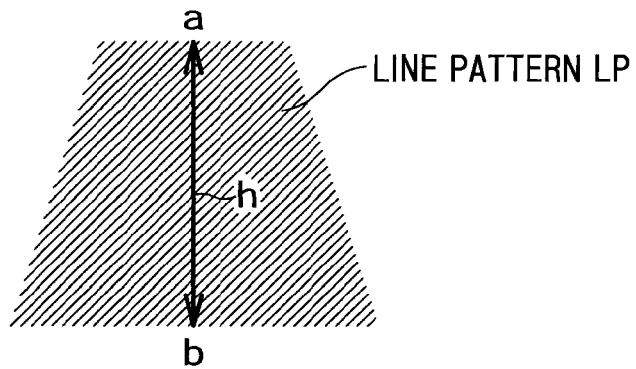
FIG. 5 is a diagram showing one example of the sectional shape of a measurement target pattern.

FIG. 3 is a flowchart schematically showing a process in a first embodiment of the pattern measurement method according to the present invention. FIG. 4 is a flowchart showing a detailed process of a waveform library creating method in the process shown in FIG. 3. In the following description, a line pattern LP having a substantially trapezoidal sectional shape as shown in FIG. 5 is taken as an example.

First of all, a waveform library of the line pattern LP is created (FIG. 3, step S10). This process is hereinafter explained more specifically referring to FIG. 4.

A process parameter range for creating the line pattern LP and a positional range on a wafer W are first set (step S11). The line pattern LP is created through several pattern manufacturing steps, and thus a process parameter is set as described above in a manner that a pattern having a desired shape may be formed. However, unexpected variations of the process parameter are produced in an actual manufacturing process, and the shape of the pattern varies with the variations of the process parameter. For example, the shape of a wiring pattern produced by an etching process varies due to a gas flow volume, pressure and radio frequency (RF) power, while the shape of a resist pattern produced by a lithographic process varies due to a focus position and a dose amount. Therefore, the process parameter used to create the waveform library needs to be set at various values to allow for variations in real process steps. However, in the present embodiment, it is assumed that the shape of a pattern is set by two process parameters A and B for simplification of explanation. Three values A1, A2 and A3 are set as the process parameter A, and three values B1, B2 and B3 are set as the parameter B. The respective set values are inputted to the first simulator 32 of the library creating unit 30.

Then, the process parameters are varied by the first simulator 32 within the set ranges to perform a simulation of the shape of the line pattern LP, so that the sectional shape of the pattern is predicted (FIG. 4, step S12). In varying the process parameters, for example, the values A2 and B2 are set as target values of the parameters, the values A1 and B1 are set as lower limit values of the parameters, and the values A3 and B3 are set as upper limit values. Here, the upper limit values and the lower limit values may be determined from the fluctuation band of an actual process.

Figure 6:
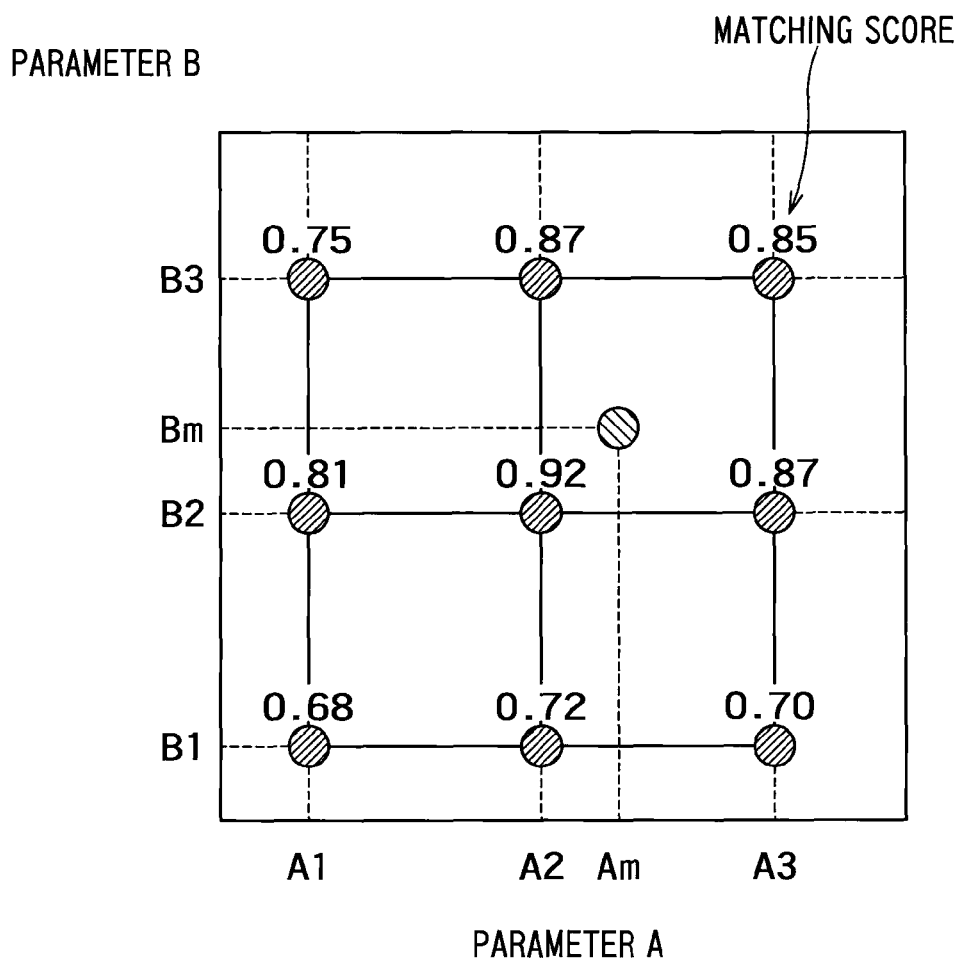
FIG. 6 is a graph showing one example of a result of a pattern sectional shape simulation.

As a result, as shown in FIG. 6, a pattern sectional shape simulation is performed on nine coordinate points of a parameter plane. One such simulation technique recently available is a technical-computer added design (T-CAD) technique based on physical laws. In addition, without depending on the simulation, the line pattern LP may be actually processed under the above-mentioned nine conditions, and the shape of the section of the line pattern LP may be acquired by, for example, sectional SEM or an atomic force microscope (AFM).

Then, an optical simulation is performed by the second simulator 34 on the predicted sectional shape of the pattern obtained as described above. A predicted spectral waveform which would be obtained when light is applied to the line pattern LP is calculated, and information on the corresponding process parameter is added to the calculated predicted spectral waveform to form a waveform library (step S13).

The optical simulation is performed under conditions including, for example, the wavelength and incident angle θ of light Li which is used when a spectral waveform of the pattern TP as the measurement target is actually acquired by the later-described process.

In conventional scatterometry, the sectional shape of a pattern is represented by several shape parameters to allow for the variations of the sectional shape of the pattern, and these shape parameters are changed to create a waveform library. However, the present embodiment is characterized in that the process parameter is changed to form the waveform library instead of changing the shape parameters.

It seems that constructing the waveform library by use of the shape parameters as in the conventional technique is more rational. However, when there is less information on the sectional shape of a pattern to be created as in the case of a new manufacturing process, unlimited variations have to be conceived as the changes of the pattern, so that a great amount of work is imposed for library creation. In accordance with the present embodiment, since the waveform library is created on the basis of the process parameter, it is enough to only consider a set value and its variations, and the waveform library can be relatively small.

Figure 7:
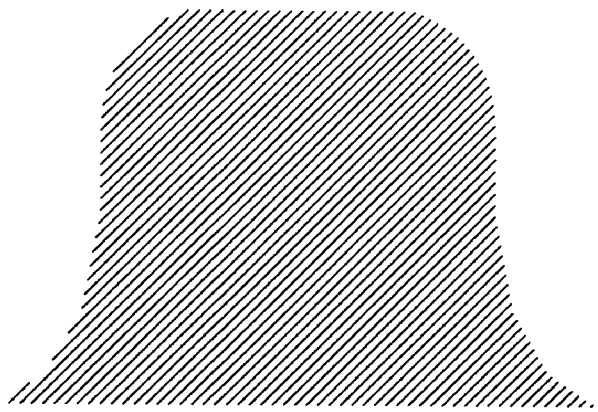
FIGS. 7 and 8 are diagrams explaining a waveform library creating method according to a conventional technique.
Figure 8:
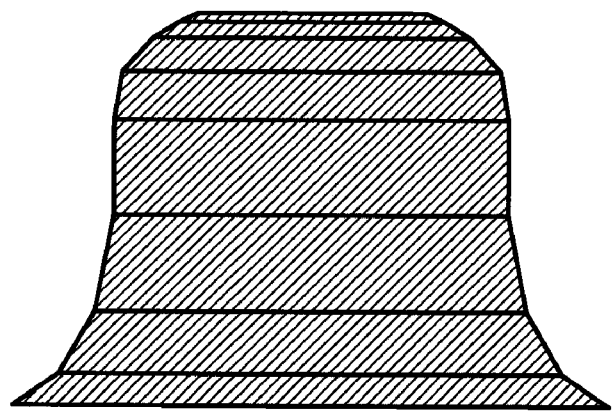

For example, a trapezoidal modeling as shown in FIG. 7 is used as a shape parameter. In this case, if, for example, eight trapezoids are combined together as shown in FIG. 8, a waveform library composed of 8×2=16 shape parameters has to be created because the sectional shape of one trapezoid is described by two parameters (base and height). A more complex shape of a measurement target pattern or higher accuracy required for a measurement leads to increased parameters. Here, the problem of the conventional technique lies not in the number of parameters but in that no waveform library can be created without previous information on the pattern. Thus, such a procedure may be used as to start with a waveform library based on a model of the simplest one trapezoid and then gradually handle more complex shapes with reference to the result of the simplest trapezoid. In order to facilitate this procedure, the sectional shape of the pattern is previously observed by, for example, the sectional SEM or calculated by a computer simulation to predict the variations in the sectional shape of the pattern to some extent. However, a great amount of work is required to acquire a sectional SEM photograph or a simulation result.

According to the present embodiment, a waveform library can be created with the minimum information including, for example, the process of a device or the position on a wafer.

Returning to FIG. 3, the light Li is applied from the light source 10 to the pattern TP as the measurement target which is obtained by actually creating the line pattern LP on the wafer W using the set process parameter. Further, reflected diffracted light Lr is taken into the detector 16 via the analyzer 14, such that a spectral waveform of the pattern TP is actually acquired (step S30).

Then, a waveform matching is performed between the actually obtained spectral waveform and the spectral waveform of the waveform library (step S40). As a result, a matching score is obtained for each waveform matching. In the example shown in FIG. 6, nine matching scores are obtained.

Furthermore, optimum parameter coordinates providing the maximum matching score are found by a response surface methology (step S50). In the present embodiment, it is assumed that a point specified by coordinates (Am, Bm) on the graph in FIG. 6 provides the maximum score. Thus, it can be estimated that the pattern TP as the measurement target is created on the condition that a parameter A is Am and a parameter B is Bm.

Then, an optimum pattern sectional shape corresponding to an optimum process parameter is generated (FIG. 3, step S60). Such a shape can also be obtained by performing a simulation. However, in the present embodiment, in order to obtain a desired result without impairing the real-time characteristics of the measurement, the sectional shapes of the patterns corresponding to a plurality of process parameters approximate to the optimum process parameters (Am, Bm) are composed by an image composition technique in a ratio corresponding to the magnitude relation between the process parameters. Here, the image composition means an image processing technique for figuring out an intermediate, that is, for generating a shape between difference shapes when successive changes of the shape from a shape A to a shape B are displayed by moving images. In the present embodiment, this technique is used to compose simulation shapes on four coordinates around (Am, Bm), that is, (A2, B2), (A2, B3), (A3, B2), (A3, B3) to predict the shape on (Am, Bm). For simplification of explanation, a one-dimensional image composition as shown in FIG. 9 is described. In this example, a new pattern shape which is a composition of the shape of a pattern A and the shape of a pattern B in a ratio of 2:8 is generated by the following procedure:

1. During a simulation, corresponding points between the patterns A and B are set.
2. After locating the patterns A and B at given separate positions, the corresponding points are connected together by a segment, and points which divide the segment at 8:2 are generated.
3. The generated points are connected together to generate a new pattern.

The method described above can be easily expanded two-dimensionally, such that a predicted sectional shape of the pattern created by the condition (Am, Bm) can be obtained as shown in FIG. 10B. For reference, predicted sectional shapes of the pattern created by the conditions of the coordinates (A2, B2) and the coordinates (A3, B2) are shown in FIGS. 10A and 10C.

Finally, the optimum pattern sectional shape thus generated is measured (FIG. 3, step S70), so that a desired result such as a CD can be obtained.

(3) Second Embodiment of Pattern Measurement Method

Figure 11:
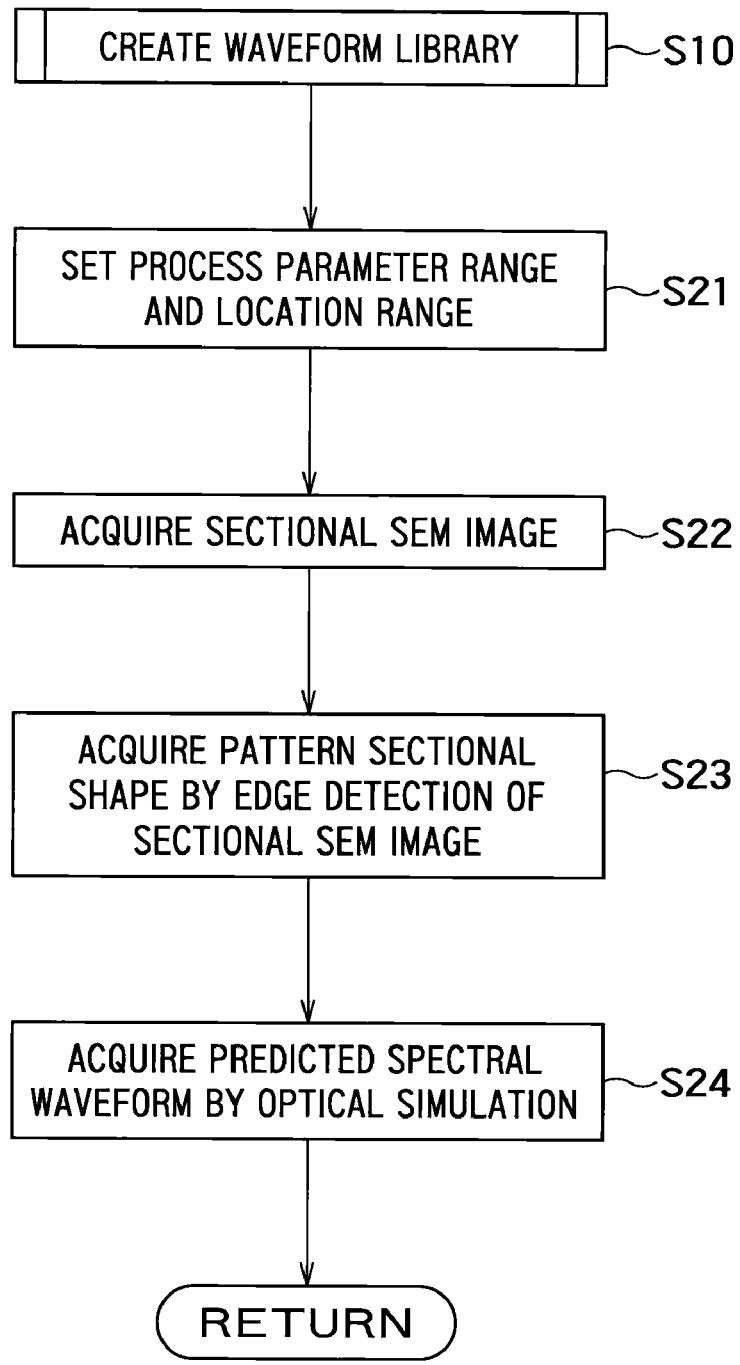
FIG. 11 is a flowchart showing a detailed process of a waveform library creating method in a second embodiment of a pattern measurement method according to the present invention.

While the sectional shape of the line pattern LP is obtained from a simulation in the first embodiment described above, the present embodiment is characterized in that the sectional shape of the line pattern LP is obtained from an actual pattern measurement result based on the sectional SEM or AFM in creating a waveform library. This case is different from the embodiment previously described in that following two steps are further needed. One step of the detailed process of creating a waveform library corresponds to step S12 in FIG. 4, wherein an edge is detected from the obtained sectional SEM image (step S22) as shown in FIG. 11 (step S23). This is attributed to the fact that the edge of the sectional SEM image is not obvious. Another additional step is a step of taking corresponding points in composing the sectional shapes (FIG. 3, step S60). Various methods are conceivable to achieve the latter step. The present embodiment uses the technique of robust point matching proposed in the following document:

Haili Chui, Anand Rangarajan, A new algorithm for non-rigid point matching, IEEE Conference on Computer Vision and Pattern Recognition (CVPR), volume II, 44-51, 2000.

Other process steps are the same as the steps in the first embodiment and then the repetitive explanation thereof is omitted.

According to the present embodiment, a pattern is actually created in creating a waveform library, and complex steps are required accordingly, but a more accurate waveform library can be obtained than in the first embodiment.

(4) Program

In the embodiments described above, the series of procedures of the pattern measurement method is stored as a recipe file in the memory MR1, and read into the pattern measurement apparatus 1 and executed thereby. However, the series of procedures of the pattern measurement method described above may be incorporated into a program, and this program may be read into by a general-purpose computer and executed by this computer. This allows the pattern measurement method according to the present invention to be achieved by use of the general-purpose computer which is capable of image processing and which is connected to equipment for acquiring a spectral waveform of a pattern. The series of procedures in the pattern measurement method described above can also be stored as the program to be executed by a computer in a recording medium such as a flexible disk or a CD-ROM, and read into and executed by a general-purpose computer which is capable of image processing and which is connected to equipment for acquiring a spectral waveform of a pattern.

The recording medium is not limited to a portable medium such as a magnetic disk or an optical disk, and may be a fixed recording medium such as a hard disk drive or a memory. Moreover, the program incorporating the series of procedures of the pattern measurement method described above may be distributed via a communication line (including wireless communications) such as the Internet.

(5) Manufacturing Method of Semiconductor Devices

When the pattern measurement method described above is used, for example, in a manufacturing process of a semiconductor device, a pattern can be inspected with high accuracy and resolution, the semiconductor device can thus be manufactured in a short turn around time (TAT) with a higher yield ratio and a higher throughput.

More specifically, a semiconductor substrate is extracted per manufacturing lot, and the pattern formed on the extracted semiconductor substrate is measured and inspected using the pattern measurement method described above. As a result of the inspection, if it is determined that the semiconductor substrate is non-defective, remaining manufacturing processes is performed for the entire manufacturing lot to which the inspected semiconductor substrate belongs. On the other hand, if it is determined that the semiconductor substrate is defective and the semiconductor device can be reworked, a rework process is performed for the entire manufacturing lot to which the defective semiconductor substrate belongs. After finishing the rework process, an arbitrary semiconductor substrate is extracted from the manufacturing lot in order to be again inspected. If it is determined that the extracted semiconductor substrate is non-defective, remaining processes is performed for the manufacturing lot to which a rework process is finished. If the rework processing is impossible, the manufacturing lot to which the defective semiconductor substrate belongs is disposed of, and the cause of the defect is analyzed and fed back to a person in charge of designing, a person in charge of an upstream process or the like.

What is claimed is:

1. A pattern measurement apparatus comprising:
   a library creating unit which acquires a plurality of sectional shapes of a first pattern corresponding to a plurality of process parameters for creation of the pattern, respectively, uses the acquired plurality of sectional shapes to calculate predicted spectral waveforms which would be obtained when light is applied to the first pattern, and adds information on the corresponding process parameters to the calculated predicted spectral waveforms, respectively, to form a waveform library;
   a spectral waveform acquiring unit which actually acquires a spectral waveform of a second pattern as a measurement target, the second pattern being obtained by actually creating the first pattern by use of a process parameter set to obtain a desired shape;
   a process parameter calculating unit which performs waveform matching between the actually acquired spectral waveform and the predicted spectral waveforms to acquire matching scores for respective waveform matching, and calculates an optimum process parameter providing a maximum matching score from the obtained matching scores;
   a sectional shape generating unit which generates an optimum pattern sectional shape corresponding to the optimum process parameter; and
   a measurement unit which measures the optimum pattern sectional shape.

2. The pattern measurement apparatus according to claim 1,
   wherein the library creating unit acquires the sectional shapes of the first pattern by a simulation using design data of the first pattern.

3. The pattern measurement apparatus according to claim 1,
   wherein the library creating unit acquires the sectional shapes of the first pattern from actual sectional images of the first pattern.

4. The pattern measurement apparatus according to claim 1,
   wherein the sectional shape generating unit generates the optimum pattern sectional shape by synthesizing the sectional shapes of the first pattern corresponding to the plurality of process parameters approximate to the optimum process parameter in the waveform library in a ratio corresponding to the magnitude relation between the optimum process parameter and the plurality of approximate process parameters.

5. A pattern measurement method comprising:
   acquiring a plurality of sectional shapes of a first pattern corresponding to a plurality of process parameters for creation of the first pattern, respectively;
   using the acquired plurality of sectional shapes to calculate predicted spectral waveforms which would be obtained when light is applied to the first pattern, and adding information on the corresponding process parameters to the calculated predicted spectral waveforms, respectively, to form a waveform library;
   setting a process parameter to obtain a desired shape, and actually acquiring a spectral waveform of a second pattern as a measurement target, the second pattern being actually created from the first pattern by use of the set process parameter;
   performing waveform matching between the actually acquired spectral waveform and the predicted spectral waveforms to acquire matching scores for respective waveform matching, and calculating an optimum process parameter providing a maximum matching score from the obtained matching scores;
   generating an optimum pattern sectional shape corresponding to the optimum process parameter; and
   measuring the optimum pattern sectional shape.

6. The method of claim 5,
   wherein the sectional shapes of the first pattern are acquired by a simulation using design data of the first pattern.

7. The method of claim 5,
   wherein the sectional shapes of the first pattern are acquired from actual sectional images of the first pattern.

8. The method of claim 5,
   wherein the generating of the optimum pattern sectional shape comprises synthesizing the sectional shapes of the first pattern corresponding to the plurality of process parameters approximate to the optimum process parameter in the waveform library in a ratio corresponding to the magnitude relation between the optimum process parameter and the plurality of approximate process parameters.

* * * * *